Patented Feb. 2, 1943

2,310,161

UNITED STATES PATENT OFFICE 2,310,161

POLYMERIZATION OF OLEFINS AND CATALYST THEREFOR

Edwin T. Layng, Jersey City, N. J., assignor to The Polymerization Process Corporation, Jersey City, N. J., a corporation of Delaware No Drawing. Application February 29, 1940, Serial No. 321,521

12 Claims. (Cl. 196—10)

This invention relates to the conversion of olefinic hydrocarbons to hydrocarbons of higher boiling points, by means of catalytic contact material. More particularly, the invention relates to the conversion of olefinic hydrocarbons by means of metal pyrophosphate contact agents of improved characteristics.

Certain metal pyrophosphates, including those of copper, mercury, zinc, magnesium, iron, aluminum and cobalt are capable of promoting the conversion of olefins to higher boiling hydrocarbon products. Such pyrophosphates are advantageously employed in the form of granular masses. The granules may be formed by crushing the filter cake if the pyrophosphate is obtained by precipitation, or by pelleting or extrusion of a more finely divided mixture. Pyrophosphates are employed in the granular form in order that the fluid reactants may be passed through a granular mass of the catalytic material at relatively high velocity, and without excessive pressure drop.

Each of the pyrophosphates of the metals mentioned above becomes active in the promotion of the conversion reactions by the formation therein, under the conversion conditions employed, of an active modification which is probably the true catalyst for the reaction. Formation of the active modification probably involves reduction, such as, in the case of copper pyrophosphate, reduction of the copper from the cupric to the cuprous state.

It is found that during the conversion treatment the granules become softened whereby they collapse or disintegrate. This is probably due to the fact that the reactions which result in the formation of the active modification of the pyrophosphate affect the material which forms the structure of the granules. Consequently, during the conversion treatment the body of catalytic material employed tends to consolidate gradually whereby the pressure drop through the conversion chamber is increased. Consolidation of the granular catalytic material through collapse and disintegration of the granules may result in the accumulation, within the body of catalytic material, of relatively high boiling conversion products which are less easily removed by the flow of the fluid reactants due to the decrease in the velocity of the reactants in their passage through the body of catalytic material. Such deposits decrease the number of active centers in the catalytic material with the result that the conversion rate is decreased. As a result of increase in pressure drop and decrease in conversion rate the conversion treatment must be terminated before it would be necessary if the granular mass of catalytic material did not become softened with resulting collapse and disintegration.

It is an object of the present invention to provide a conversion treatment wherein the fluid reactants are passed over catalytic contact material, comprising an active pyrophosphate, in the form of granules which are less susceptible to collapse and disintegration than granules consisting only of the pyrophosphate. It is a further object of the invention to provide a method for the conversion of olefinic hydrocarbons to hydrocarbons of higher boiling points by the passage of said hydrocarbons over granular catalytic material which retains its shape during the conversion operation with the result that operating runs of longer duration are made possible but at the same rates of conversion as would be obtained in the presence of a granular catalytic material consisting of an active metal pyrophosphate.

The granular catalytic material employed in the conversion process comprises a plurality of granules each of which includes a substantial proportion of an active metal pyrophosphate in intimate mixture with a finely divided supporting material which is non-reactive with the metal pyrophosphate, stable under the conversion conditions, and is inert to, or non-reactive with, the modifications, or reduction products, of the pyrophosphate which are formed during the conversion reaction.

The supporting material employed may be any suitable material which is suitably inert under the conditions of the conversion treatment. Preferably it should be somewhat porous in order to facilitate the formation of the granules. It is also desirable that the supporting material have a relatively high adsorptive power.

As a general rule any carbonaceous or inorganic material substantially free from volatile material and non-reactive, as set forth above, is suitable for the purpose. Carbonaceous material formed by the charring of wood or other organic materials, carbonaceous residues from the distillation of petroleum oils, various cokes made by the carbonization of various coals, asphalts, petroleum residues, etc., or naturally occurring carbonaceous materials of suitable characteristics may be employed. Finely divided wood charcoal, particularly in an activated form, is excellently suited for the purpose provided that it does not contain large amounts of free alkali or alkaline salts.

Inorganic materials which may be employed as phosphate in the ortho, pyro, or meta form or the phosphates of tin, nickel, or lead. Additional examples of suitable inorganic supporting material are certain heavy metal sulphates such as barium sulphate and calcium sulphate.

Natural materials such as silica, kieselguhr, alumina, clay, etc. are unsuitable for use as supporting material.

The supporting material is employed in a finely divided form and generally should be sufficiently sub-divided to pass a 200 mesh screen. For maximum granular strength it is desirable that the supporting material should be employed in a form wherein the particles do not exceed approximately fifty microns in average diameter.

In accordance with the invention the catalytic contact material is employed in the form of granules which have a volume many times that of the individual particles of supporting material dispersed in each granule. Advantageously, the catalytic contact material is employed in the form of granules having an average diameter of one to ten millimeters although larger or smaller sizes may be employed as warranted by the character of the reactants and variations in the reaction conditions. Each granule will therefore have an average diameter at least ten times the average diameter of the particles of supporting material contained therein. Each granule will contain at least one hundred particles of supporting material and may include thousands of such particles.

Preferably, the desired metal pyrophosphate and the supporting material are intimately mixed and then pressed into granules of the desired size and shape. The granules may be made advantageously by extruding a mixture of the supporting material and metal pyrophosphate in the form of rods of a suitable diameter which are thereafter cut in suitable lengths to form cylindrical granules of the desired size.

The relative proportions of metal pyrophosphate and finely divided supporting material which are employed in the mixture depend upon the density of the supporting material. It is found, however, that for each supporting material employed there is a preferred range of ratios of supporting material to metal pyrophosphate in which are found the combinations which produce granules of maximum strength and resistance to softening and disintegration during the conversion treatment.

The mixture of supporting material and metal pyrophosphate is formed advantageously by maintaining an aqueous suspension of the finely divided supporting material and effecting in said suspension a precipitation of the desired metal pyrophosphate. In this way at least a portion of the metal pyrophosphate is precipitated on and, possibly, in the particles of suspended supporting material. The mixture is filtered to obtain a filter cake comprising an intimate mixture of finely divided supporting material and the desired metal pyrophosphate. The resulting mixture may be broken to form granules of the desired size or may be crushed and pressed or extruded to form pellets of the desired size.

Another method of forming the mixture of pyrophosphate and supporting material may be employed when certain salts are employed as supporting material. This involves coprecipitation of the pyrophosphate and the supporting material.

The mixture of active pyrophosphate and supporting material may be formed also by adding the finely divided supporting material to a slurry of precipitated metal pyrophosphate if adequate precautions are taken to effect a thorough mixing of the materials.

In preparing the catalytic contact material by methods which involve the precipitation of the metal pyrophosphate it is desirable in connection with certain of the pyrophosphates, particularly copper pyrophosphate, to employ the reagents, such as a soluble pyrophosphate and a soluble copper salt, in proportions such that there is no excess of the soluble pyrophosphate over the amount necessary to react with all of the metal salt present. Preferably, an excess of the metal salt is employed. This precaution is necessary because certain of the soluble pyrophosphates, such as sodium pyrophosphate, form double salts with copper pyrophosphate and other metal pyrophosphates. The presence of such double salts, during the conversion treatment, appears to retard reduction of the metal pyrophosphates to the active form.

In observing such precautions it is desirable to effect thorough mixing of the soluble pyrophosphate solution and the metal salt solution, and it is advantageous to mix the solutions by pouring the solution of the soluble pyrophosphate, such as sodium pyrophosphate, into the metal salt solution whereby there is maintained during the precipitation reaction an excess of the metal salt in relation to the soluble pyrophosphate. Advantageously, the finely divided supporting material is suspended in a solution of the metal salt, such as copper sulphate, and while the suspension is maintained, for example by stirring, the soluble pyrophosphate solution is admixed therewith. After continued stirring to insure adequate mixing of the ingredients the resulting mixture of precipitated metal pyrophosphate and supporting material is separated from accompanying water and formed into pellets, as has been described.

The granular material thus prepared may be used as such or may have admixed therewith granules of inactive material, such as granular charcoal, the latter acting as a spacer in the contact material.

In its preferred form the process of the invention involves the use of catalytic contact material wherein finely divided activated wood charcoal is employed as the supporting material. Such material should be sufficiently subdivided whereby it is capable of passing through a 200 mesh sieve and preferably should be even more finely divided.

In the use of the finely divided activated wood charcoal it is found that catalytic contact material consisting of the desired metal pyrophosphate and approximately 25 to 40 per cent of the charcoal possesses a resistance to softening and disintegration of the granules which exceeds that of the material containing lesser or greater proportions of the charcoal. Advantageously, the contact material may consist of approximately one third by weight of the charcoal and two thirds by weight of the metal pyrophosphate, such as copper pyrophosphate.

The invention will be described further by reference to specific examples wherein copper pyrophosphate is employed as the desired metal pyrophosphate and finely divided carbonaceous material is employed as the supporting material. It is to be understood, however, that such examples are intended merely to illustrate the application of the invention and are not intended to limit the scope of the invention which includes the use of other active metal pyrophosphates and other suitable supporting materials. The examples furthermore relate particularly to the treatment of normally gaseous hydrocarbon mixtures including gaseous olefins. It is to be understood, however, that the invention is not limited to the treatment of normally gaseous olefinic hydrocarbons but is applicable to the treatment of normally liquid olefinic hydrocarbons or mixtures of liquid and gaseous olefinic hydrocarbons.

*Example I*

252.2 grams of copper sulphate ($CuSO_4.5H_2O$) were dissolved in two liters of water. 223.1 grams of sodium pyrophosphate ($Na_4P_2O_7.10H_2O$) were dissolved separately in three liters of water. 80 grams of activated wood charcoal in the form of a powder sufficiently fine to pass a 270 mesh sieve were suspended in the copper sulphate solution and the suspension maintained by stirring. The sodium pyrophosphate solution was then added quickly to the suspension with rapid stirring. The mixture was stirred for four hours thereafter and filtered. The filter cake was washed with distilled water and then dried at 220° F. for one day. The dried cake was crushed, and a granular portion thereof having a mesh size of 8 to 20 was separated. The preparation then consisted of one third carbon by weight and had an apparent density of approximately 0.4. The catalytic contact material thus prepared was employed in the conversion treatment of a hydrocarbon gas consisting of approximately, by weight, 58 per cent butane, 27 per cent normal butylene and 15 per cent iso butylene. The dry gas was passed through the granular catalytic contact material at a rate of approximately 36 cubic feet (measured as gas at standard conditions of temperature and pressure) per pound of catalytic material per hour under a pressure of 1400 pounds per square inch. At a reaction temperature of 400° F. the product contained approximately 42 per cent of liquid by weight. After the production of approximately 36 gallons of liquid per pound of catalytic material employed the conversion treatment was terminated, and the greater part of the catalytic contact material was recovered in granular form.

*Example II*

1261 grams of copper sulphate ($CuSO_4.5H_2O$) were dissolved in 10 liters of water. 665.5 grams of sodium pyrophosphate ($Na_4P_2O_7$) were dissolved separately in 15 liters of water. 400 grams of finely divided activated charcoal prepared as in Example I were suspended in the copper sulphate solution and the suspension was maintained by stirring. The sodium pyrophosphate solution was then added with stirring and the mixture was stirred for four hours thereafter. The mixture of precipitated copper pyrophosphate and carbon was filtered, and after being washed several times with water the filter cake was filtered and washed several times with distilled water. The washed filter cake was then dried by suction and heated for six hours at 220° F. After cooling and further mixing the mixture was extruded into rods $\frac{3}{32}$ inch in diameter. The rods were then further dried at 220° F. for 24 hours and then broken into $\frac{5}{32}$ inch lengths (approximately). This material had an apparent density of 0.46. The catalytic contact material thus prepared was then employed in the conversion treatment of a hydrocarbon gas consisting of approximately 39 per cent butane, 15 per cent normal butylene, 9 per cent iso butylene, 17 per cent propane and 19 per cent propylene. The gas was passed through the granular mass of catalytic contact material, after being saturated at 120° F., at a pressure of 800 pounds per square inch and at a rate of approximately 20 cubic feet (measured as gas at standard conditions of temperature and pressure) per pound of catalytic contact material per hour (or 440 volumes per hour per volume of contact material). At a reaction temperature of 400° F. the product had a polymer content of approximately 32 per cent by weight. At a reaction temperature of 425° F. the product had a polymer content of 38 per cent of which 96 per cent boiled below 400° F. The 400° F. end point polymer had an octane number of 82.3 C. F. R. M. After a run of 272 hours, during which a total polymer production of approximately 34 gallons per pound of catalytic material employed was reached, the catalyst was recovered in pellet form.

*Example III*

Catalytic contact material prepared as in Example II was employed in the treatment of a hydrocarbon gas consisting of approximately by weight 39 per cent butane, 17 per cent normal butylene, 8 per cent iso butylene, 16 per cent propane and 20 per cent propylene. The gas was passed through the granular mass in the dry state at a pressure of 1400 pounds per square inch at a rate of 10 cubic feet (measured as gas at standard conditions of temperature and pressure) per pound of catalytic contact material employed per hour (or 250 volumes per hour per volume of contact material). At a reaction temperature of 425° F. the reaction product had a polymer content of 41 per cent of which 95 per cent boiled below 400° F. The 400° F. endpoint polymer had an octane number of 81.7 C. F. R. M. After a run of 368 hours, during which a total polymer production of approximately 22 gallons per pound of catalytic material employed was reached, the contact material was recovered in pellet form.

*Example IV*

Catalytic contact material was prepared as in Example II with the exception that the filter cake was heated at 220° F. until analysis showed the water content to be 56 per cent by weight. After extrusion and drying as before the rods were cut into $\frac{5}{32}$ inch sections. A density measurement of these sections showed an apparent density of 0.5. Catalytic contact material thus prepared was employed in the treatment of a hydrocarbon gas consisting approximately by weight of 40 per cent butane, 8 per cent iso butylene, 17 per cent normal butylene, 15 per cent propane and 20 per cent propylene. The gas, saturated with water vapor at 85° F. and the operating pressure, was passed through the granular contact material under a pressure of 1400 pounds per square inch at a feed rate of 17 cubic feet (measured as gas at standard conditions of temperature and pressure) per pound of catalytic contact material per hour (or 500 volumes per volume of catalytic contact material per hour). At a reaction temperature of 400° F. the reaction product had a polymer content of 37 per cent of which 98 per cent boiled below 400° F. The 400° F. end point polymer had an octane number of 82 C. F. R. M. The polymer product contained 63 per cent of aviation fuel (90 per cent over at 275° F.) which, after hydrogenation, had an octane number of 71.9 C. F. R. M., which was raised to 84.4 by the addition of 1 cc. of tetraethyl lead per gallon. After a run of approximately 290 hours in which 34 gallons of polymer product per pound of contact material employed were produced the contact material was recovered in pellet form.

*Example V*

Catalytic contact material prepared as in Example IV was employed in the treatment of a gas of similar composition. In this case, however, the gas was passed through the contact mass under a pressure of 800 pounds per square inch at a rate of approximately 19 cubic feet (measured as gas at standard conditions of temperature and pressure) per pound of catalytic contact material per hour (or 570 volumes of gas per hour per volume of contact material). At a reaction temperature of 400° F. the reaction product had a polymer content of 40 per cent of which 96 per cent boiled below 400° F. The 400° F. endpoint polymer had an octane number of 82.3 C. F. R. M. The treatment was continued during a run of approximately 250 hours with the production of 34 gallons of polymer per pound of contact material employed after which the contact material was recovered in pellet form.

*Example VI*

Catalytic contact material was prepared as in Example IV except that the mixture before extrusion was dried to a water content of approximately 54 per cent, and the extruded rods were then dried at room temperature for 60 hours and then at 220° F. for 24 hours. The cut sections had an apparent density of approximately .5. Catalytic contact material thus prepared was employed in the treatment of a hydrocarbon gas consisting approximately by weight of 35 per cent butane, 8 per cent iso butylene, 16 per cent normal butylene, 19 per cent propane and 21 per cent propylene. The gas, saturated with water vapor at 85° F. and the operating pressure, was passed through the granular contact mass under a pressure of 450 pounds per square inch at a rate of approximately 18 cubic feet (measured as gas at standard conditions of temperature and pressure) per pound of contact material per hour (or 533 volumes of gas per hour per volume of contact material employed). At a reaction temperature of 400° F. the reaction product had a polymer content of approximately 35 per cent of which 94 per cent boiled below 400° F. The 400° F. end point polymer had an octane number of 82.3 C. F. R. M. The treatment was continued during a run of approximately 225 hours with a production of approximately 18 gallons of polymer per pound of catalytic contact material employed after which the contact material was recovered in granular form.

*Example VII*

Catalytic contact material was prepared as in Example II except that the filter cake was dried with occasional stirring until its water content was 50.5 per cent by weight after which it was forced through an 8 mesh sieve to obtain a material of uniform size. This material was then thoroughly mixed and finally extruded through a $\frac{3}{32}$ inch die. After extrusion the rods were dried at 220° F. for 24 hours. A 400 cc. volume of the cut sections exhibited an apparent density of 0.57. Catalytic contact material thus prepared was employed in the treatment of hydrocarbon gases consisting of butane, iso butylene, normal butylene, propane and propylene in varying proportions and saturated at 85° F. At a pressure of 800 pounds per square inch and a reaction temperature of 400° F. the treatment was continued during a run of nearly 1600 hours with a total polymer production of 131 gallons per pound of catalytic contact material employed. The greater part of the contact material was recovered in the original pellet form. During a portion of this run a hydrocarbon gas consisting of 44 per cent butane, 7 per cent iso butylene, 20 per cent normal butylene, 13 per cent propane and 16 per cent propylene was passed through the catalytic contact mass at a rate of 10 cubic feet (measured as gas at standard conditions of temperature and pressure) per pound of catalytic contact material per hour (or 275 volumes of gas per hour per volume of contact material). The product of the treatment of this gas had a polymer content of 36 per cent of which 94 per cent boiled below 400° F. The 400° F. end point polymer had a Reid vapor pressure of approximately one pound per square inch and a C. F. R. M octane number of approximately 83.

It will be noted that in the foregoing examples, in the preparation of the catalytic contact material, the filter cake before extrusion is dried to various percentages of water content. It is found that the preparation of the catalyst, as in the foregoing examples, the mixture, prior to extrusion, should be dried to a water content of not more than 60 per cent and not less than 40 per cent in order to produce pellets of sufficient strength. In general it is noted that the apparent density of the dried pellets is a direct function of the water content of the extruded mixture, higher density being associated with lower percentages of water. The mechanical strength of the pellets is improved with increasing apparent density.

In carrying out the process of the invention as illustrated by the foregoing examples the gases or other hydrocarbon fluid are passed in contact with the catalytic contact material in a suitable chamber or reactor, the gases being suitably preheated. Any suitable pressure may be used, but it is preferable to employ relatively high pressures, for example in excess of 150 pounds per square inch, although atmospheric pressure or lower pressures may be employed. The rate of polymerization of the olefinic hydrocarbons is a function of the concentration of these materials, and accordingly for maximum conversion such reactions are best run at superatmospheric pressure. The use of relatively high pressures apparently also has a beneficial effect on the granular contact material in assisting to preserve its original form whereby runs of longer duration are possible. For example, the used contact material from the run described in Example IV (1400 pounds per square inch) was in better condition than that from the run of Example V (800 pounds per square inch) and the latter was in better condition than the used contact material from the run of Example VI (450 pounds per square inch). Ordinarily pressures in excess of 500 pounds per square inch are to be preferred.

The optimum reaction temperature depends somewhat upon the nature of the material under treatment and the product desired. For example, conversion of gaseous olefins such as butylenes at a temperature of approximately 300° to 400° F. is advantageous for effecting maximum conversion to a product consisting essentially of gasoline constituents. In the treatment of a gaseous mixture containing substantial quantities of propylene, as in some of the foregoing examples, a temperature of 400° F. or higher is desirable for effecting substantial conversion.

The extent of reaction and the character of the liquid product are affected also by the length of reaction time during which the charge remains in contact with the contact material under the operating conditions. In general the hydrocarbons should be passed over the contact material at a rate of 2 to 50 cubic feet (measured as gas at standard conditions of temperature and pressure) per pound of catalyst per hour. Otherwise expressed, the hydrocarbon fluid may be passed through the reactor at a rate of 50 to 6000 volumes per hour per volume of catalytic contact material depending upon the apparent density of the contact material. For material having an apparent density of about 0.5 this range would be 60 to 1500 volumes per volume of contact material per hour.

It is apparent that for any given charge the extent of reaction and the character of the liquid product depend mainly upon the operating pressure, the operating temperature and the space velocity of the charge. Many combinations of these variables will yield the desired amount and quality of product. For example, in the treatment of a gaseous mixture containing substantial quantities of isobutylene it may be desirable to operate at a relatively low temperature or with relatively great space velocity, or both, in order to limit the extent of conversion whereby the product consists largely of the polymers of isobutylene. Within the range of operating temperatures preferred in the present process (300° to 600° F.) isobutylene is more readily polymerized than normal butylene or propylene whereby selective polymerization may be effected by limiting the extent of conversion as described. Naturally more complete conversion may be effected by raising the temperature or reducing the space velocity, or both.

The moisture content of the reaction mixture apparently has no direct effect on the reaction. However, a saturated charge apparently has a slight beneficial effect in maintaining the original condition of the contact material. In any event, therefore, there is no necessity for complete drying of the charge to the process.

I claim:

1. The method of converting olefinic hydrocarbons to hydrocarbons of higher boiling points which comprises contacting said olefinic hydrocarbons at elevated temperature with a catalytic contact material comprising a granular mass wherein each granule consists of a mixture of at least one metal pyrophosphate capable of reduction to a polymerization catalyst and a plurality of particles of finely divided carbonaceous material, the said granules of said mass being sufficiently large whereby fluid reactants may be passed through said granular mass at relatively high velocity and without excessive pressure drop, and the said carbonaceous material being sufficiently finely divided whereby it is capable of passing through a 200 mesh sieve.

2. The method of claim 1 wherein said metal pyrophosphate is selected from the group consisting of the pyrophosphates of copper, mercury, zinc, magnesium, iron, aluminum and cobalt.

3. The method of claim 1 wherein said metal pyrophosphate is copper pyrophosphate.

4. The method of claim 1 wherein said metal pyrophosphate is mercury pyrophosphate.

5. The method of claim 1 wherein said metal pyrophosphate is cobalt pyrophosphate.

6. Catalytic contact material for promoting polymerization of olefinic hydrocarbons comprising a plurality of granules each consisting of an intimate mixture of at least one metal pyrophosphate capable of reduction to a polymerization catalyst and a plurality of particles of finely divided carbonaceous material, the said granules being sufficiently large whereby fluid reactants may be passed through a consolidated mass of said granules at relatively high velocity and without excessive pressure drop, and the said carbonaceous material being sufficiently finely divided whereby it is capable of passing through a 200 mesh sieve.

7. Catalytic contact material for promoting the polymerization of olefinic hydrocarbons comprising a plurality of granules each consisting of an intimate mixture of copper pyrophosphate and a plurality of particles of finely divided carbonaceous material, the said granules being sufficiently large whereby fluid reactants may be passed through a consolidated mass of said granules at relatively high velocity and without excessive pressure drop, and the said carbonaceous material being sufficiently finely divided whereby it is capable of passing through a 200 mesh sieve.

8. Catalytic contact material for promoting the polymerization of olefinic hydrocarbons comprising a plurality of granules each consisting of an intimate mixture of at least one metal pyrophosphate capable of reduction to a polymerization catalyst and finely divided carbonaceous material, the particles of said carbonaceous material having an average diameter not substantially greater than fifty microns.

9. Catalytic contact material for promoting the conversion of olefinic hydrocarbons consisting of a plurality of granules each consisting of an intimate mixture of one part by weight of finely divided wood charcoal and two parts by weight of copper pyrophosphate, the said granules having an average diameter of one to ten millimeters and the particles of wood charcoal having an average diameter not substantially greater than fifty microns.

10. The method of converting olefinic hydrocarbons to hydrocarbons of higher boiling points which comprises contacting said olefinic hydrocarbon at elevated temperature with a granular mass comprising a plurality of granules each consisting of a mixture of at least one metal pyrophosphate capable of reduction to a polymerization catalyst and a plurality of particles of finely divided carbonaceous material, the said granules being sufficiently large whereby fluid reactants may be passed through said granular mass at relatively high velocity and without excessive pressure drop, and said finely divided carbonaceous material having an average diameter not substantially greater than 50 microns.

11. The method of converting olefinic hydrocarbons to hydrocarbons of higher boiling points which comprises contacting said olefinic hydrocarbons at elevated temperature with a granular mass comprising granules each consisting of a mixture of 60 to 75 per cent by weight of at least one metal pyrophosphate capable of reduction to a polymerization catalyst and 25 to 40 per cent by weight of carbonaceous material sufficiently finely divided to pass through a 200 mesh sieve, said granules being sufficiently large whereby fluid reactants may be passed through said granular mass at relatively high velocity and without excessive pressure drop.

12. The method of converting olefinic hydrocarbons to hydrocarbons of higher boiling points which comprises contacting said olefinic hydrocarbons at elevated temperature with a granular mass comprising a plurality of granules having an average diameter of 1 to 10 millimeters and each consisting of a mixture of approximately one part by weight of finely divided wood charcoal having an average diameter not substantially greater than 50 microns and two parts by weight of copper pyrophosphate.

EDWIN T. LAYNG.

CERTIFICATE OF CORRECTION.

Patent No. 2,310,161.  February 2, 1943.

EDWIN T. LAYNG.

It is hereby certified that error appears in the printed specification of the above numbered patent requiring correction as follows: Page 1, second column, line 43, after the word "purpose" strike out the comma and insert instead a period; page 2, first column, lines 1, 2 and 3 inclusive, strike out "phosphate in the orthor, pyro, or meta form or the phosphates of tin, nickel, or lead. Additional examples of suitable inorganic"; page 5, second column, lines 56 and 57, for "hydrocarbon" read --hydrocarbons--; and that the said Letters Patent should be read with this correction therein that the same may conform to the record of the case in the Patent Office.

Signed and sealed this 6th day of April, A. D. 1943.

(Seal)

Henry Van Arsdale,
Acting Commissioner of Patents.